United States Patent
Liu et al.

(10) Patent No.: US 7,362,536 B1
(45) Date of Patent: Apr. 22, 2008

(54) DISK DRIVE THAT COMPENSATES FOR PHASE INCOHERENCE BETWEEN RADIALLY ADJACENT SERVO TRACKS AND METHODS THEREOF

(75) Inventors: Jingfeng Liu, Longmont, CO (US); Jinghuan Chen, Newport Beach, CA (US); Steve Aronson, Westborough, MA (US)

(73) Assignee: Maxtor Corporation, Longmont, CO (US)

( * ) Notice: Subject to any disclaimer, the term of this patent is extended or adjusted under 35 U.S.C. 154(b) by 58 days.

(21) Appl. No.: 11/440,623

(22) Filed: May 25, 2006

Related U.S. Application Data

(60) Provisional application No. 60/697,663, filed on Jul. 8, 2005.

(51) Int. Cl.
  G11B 5/596 (2006.01)
  G11B 21/02 (2006.01)
(52) U.S. Cl. .................................... 360/77.02; 360/75
(58) Field of Classification Search .................. None
  See application file for complete search history.

(56) References Cited

U.S. PATENT DOCUMENTS

| | | | |
|---|---|---|---|
| 5,301,072 A * | 4/1994 | Wilson | 360/77.01 |
| 6,452,990 B1 * | 9/2002 | Leis et al. | 375/361 |
| 6,738,205 B1 * | 5/2004 | Moran et al. | 360/17 |

* cited by examiner

*Primary Examiner*—K. Wong
(74) *Attorney, Agent, or Firm*—Myers Bigel Sibley & Sajovec, P.A.

(57) ABSTRACT

Methods of compensating for radial incoherence in servo information that is read from adjacent servo tracks that have a phase offset relative to one another on a data storage disk of a disk drive are provided. While a transducer is seeking to a target track, the transducer generate a servo information signal that has a first component from servo information read from a first servo track on the disk and a second component from servo information read from a second servo track that is radially adjacent to the first servo track. The servo information in the first and second servo tracks are offset by a non-zero phase error relative to one another and are in a same servo sector on the disk. The servo information signal is sampled to generate a series of sampled servo values. A phase error of a group of the sampled servo values is determined. The sampled servo values are compensated in response to the determined phase error to generate compensated servo values with at least reduced phase error.

23 Claims, 6 Drawing Sheets

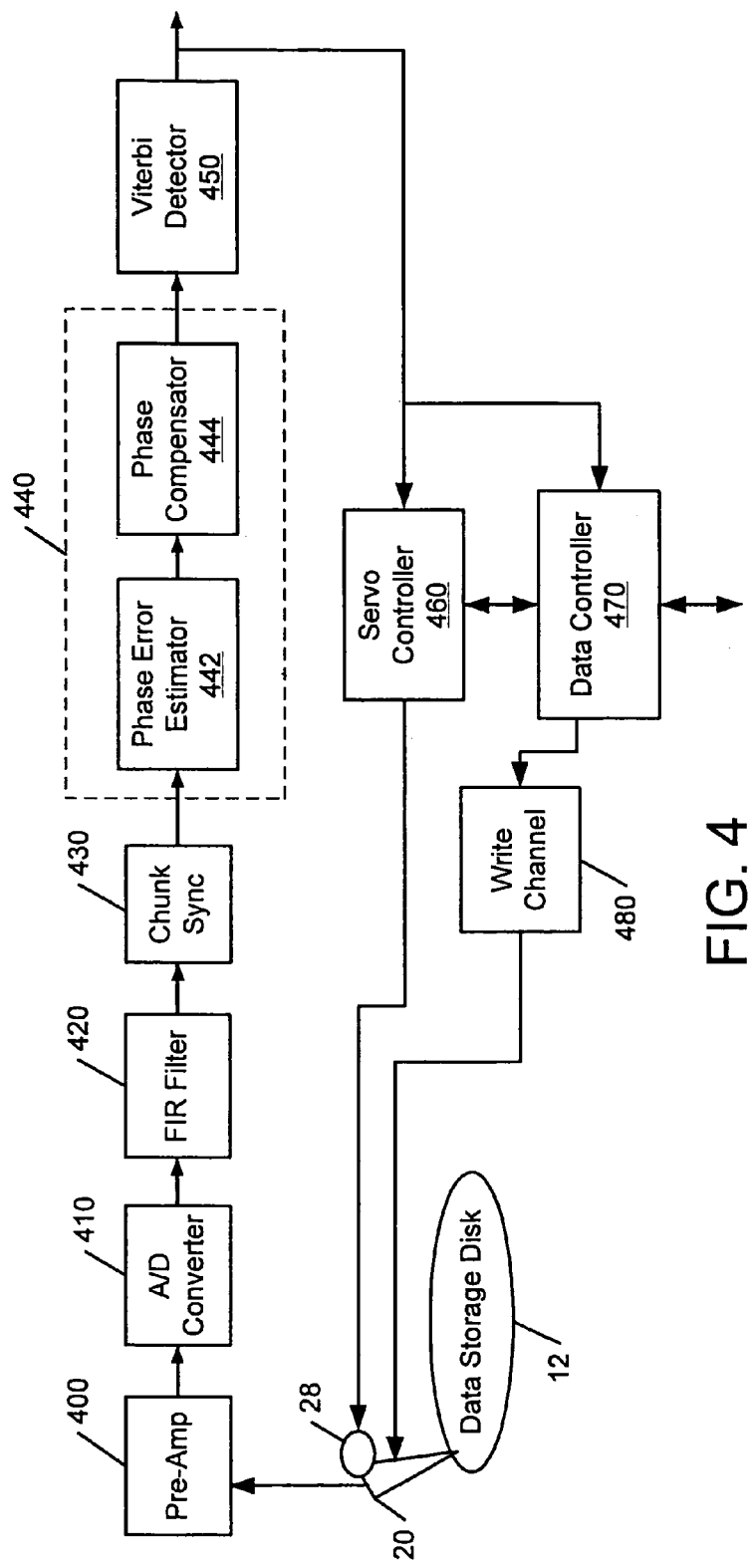

US 7,362,536 B1

DISK DRIVE THAT COMPENSATES FOR PHASE INCOHERENCE BETWEEN RADIALLY ADJACENT SERVO TRACKS AND METHODS THEREOF

RELATED APPLICATION

This application claims the benefit of and priority to U.S. Provisional Patent Application No. 60/697,663, filed Jul. 8, 2005, the disclosure of which is hereby incorporated herein by reference as if set forth in its entirety.

FIELD OF THE INVENTION

The present invention relates to disk based storage devices and, more particularly, to positioning transducers based on servo burst patterns on a disk.

BACKGROUND OF THE INVENTION

A simplified diagrammatic representation of a disk drive, generally designated as 10, is illustrated in FIG. 1. The disk drive 10 includes a data storage disk 12 that is rotated by a spindle motor 14. The spindle motor 14 is mounted to a base plate 16. An actuator arm assembly 18 is also mounted to the base plate 16.

The actuator arm assembly 18 includes a read/write transducer 20 (or head) mounted to a flexure arm 22 which is attached to an actuator arm 24 that can rotate about a pivot bearing assembly 26. The actuator arm assembly 18 also includes a voice coil motor (VCM) 28 which moves the transducer 20 relative to tracks defined on the disk 12. The spindle motor 14, VCM 28, and transducer 20 are coupled to a number of electronic circuits 30 mounted to a printed circuit board 32. Although a single disk 12 is illustrated in FIG. 1, the disk drive 10 may instead include a plurality of disks with a transducer adjacent to each disk storage surface.

FIG. 2 is an exemplary top view of the disk 12. Data is stored on the disk 12 within a number of concentric tracks 40 (or cylinders). Each track is divided into a plurality of radially extending sectors 42 of the disk 12. Each sector 42 is further divided into a servo sector 44 and a data sector 46. Information in the servo sectors 44 is used to, among other things, accurately position the transducer 20 so that user data can be properly written onto and read from the data sectors 46.

FIG. 3 illustrates exemplary servo information 73 that can be stored in each of the servo sectors 44. The servo information 73 can include a DC erase field 731, a preamble field 732, a servo address mark (SAM) field 733, a track number field indicated by its least significant bits (LSBs) 734, a spoke number field 735, an entire track number field 736 which is recorded in at least one of the servo sectors 44, and a servo burst field 737 of circumferentially staggered radially offset servo bursts (e.g., A, B, C, D servo bursts). FIG. 3 also illustrates an exemplary length of each of the fields in units of servo bit times (T) (i.e., field 731 may have a length of 40 bit times (40 T)). The DC erase field 731 can indicate to the circuits 30 the onset of a servo sector 44. The preamble field 732 can be written with a 2 T repeating pattern (e.g., "--++ --++ --++") of a defined length. The preamble 732 may be used by timing and gain loops in the circuits 30 to establish a gain and phase lock relationship for sampling the analog signal that is generated when reading the servo information through the transducer 20.

A servo controller in the electronic circuits 30 determines the position of the transducer 20 relative to the tracks 40 in response to the servo information read from the servo sectors 44. The servo controller uses the determined position to move the transducer 20 from an initial track to a target track (i.e., seek operation), and to maintained the transducer 20 aligned with the target track while data is read/written on the disk 12 (i.e., track following operation). During a seek operation, the track addresses are used as coarse positioning information to estimate the position of the transducer 40 as it is moved to the target track. During track following, the servo bursts are used as fine positioning information to precisely align the transducer 40 over the selected track.

While seeking the transducer 20 across tracks, the transducer 20 can read servo information from several radially adjacent servo tracks within a same one of the servo sectors 44. Consequently, the signal that is read while crossing a servo sector can include a combination of servo information from different servo tracks. As the seek speed increases and/or as servo information density increases, the transducer 20 can read from a greater number of radially adjacent servo tracks in the same servo sector. In an attempt to allow the servo controller to distinguish between the combined servo information signal, the track addresses can be encoded as Gray-coded addresses in which the encoded addresses of any two radially adjacent tracks differ from each other by only in a single bit position. Accordingly, when the transducer 20 scans across two servo tracks the ambiguity after decoding the address is one track. A positioning error of one track can be acceptable while seeking.

Also, because the transducer 20 can read from several different servo tracks in a servo sector while scanning, an attempt is made when formatting the disk 12 to write the servo information so that it is phase aligned between radially adjacent servo tracks. However, the servo-track writers ("STW") used to format disks have limited accuracy, and they typically allow at least some amount of phase misalignment to occur between servo information in radially adjacent servo tracks. This phase misalignment is known as radial incoherence.

SUMMARY OF THE INVENTION

Some embodiments of the present invention provide a method of compensating for radial incoherence in servo information that is read from adjacent servo tracks that have a phase offset relative to one another on a data storage disk of a disk drive. While a transducer is seeking to a target track, the transducer generate a servo information signal that has a first component from servo information read from a first servo track on the disk and a second component from servo information read from a second servo track that is radially adjacent to the first servo track. The servo information in the first and second servo tracks are offset by a non-zero phase error relative to one another and are in a same servo sector on the disk. The servo information signal is sampled to generate a series of sampled servo values. A phase error of a group of the sampled servo values is determined. The sampled servo values are compensated in response to the determined phase error to generate compensated servo values with at least reduced phase error.

The servo information signal can be generated based on reading Gray code fields in the same servo sector. The phase error of a group of the sampled servo values can be determined based on a ratio between at least some of the group of sampled servo values. In some embodiments, the sampled servo values are wide bi-phase coded, the group of the sampled servo values have $y_1$, $y_2$, $y_3$, and $y_4$ values, and the phase error $\hat{\tau}$ is determined based on the following relationship:

$$\hat{\tau} = \frac{2}{\pi} a\tan\left(\frac{y_1 - y_3}{y_2 - y_4}\right) - 0.5.$$

In some further embodiments, the amplitudes of the sampled servo values are adjusted in response to the determined phase error to generate the compensated servo values. Adjustment of the amplitudes of the sampled servo values can be carried out by interpolating among the amplitudes of the sampled servo values based on the determined phase error. The sampled servo values can be wide bi-phase coded, the group of the sampled servo values can have $y_1$, $y_2$, $y_3$, and $y_4$ values, and the interpolation among the amplitudes of the sampled servo values based on the determined phase error $\hat{\tau}$ can be carried out by determining adjusted sampled servo values $\hat{y}_1$, $\hat{y}_2$, $\hat{y}_3$, and/or $\hat{y}_4$ based on respective ones of the following relationships:

$$\hat{y}_1 = y_1 + \left(\frac{y_2 - y_1}{T}\right) * \tau,$$

$$\hat{y}_2 = y_2 + \left(\frac{y_2 - y_1}{T}\right) * \tau,$$

$$\hat{y}_3 = y_3 + \left(\frac{y_4 - y_3}{T}\right) * \tau, \text{ and}$$

$$\hat{y}_4 = y_4 + \left(\frac{y_4 - y_3}{T}\right) * \tau.$$

Some other embodiments of the present invention are directed a disk drive that is configured to compensate for radial incoherence in servo information that is read from adjacent servo tracks that have a phase offset relative to one another on a data storage disk.

DESCRIPTION OF THE DRAWINGS

FIG. 3 is a block diagram of conventional servo information fields in a servo sector.

FIG. 4 is a block diagram of a disk drive and illustrates a servo channel, a servo controller, and associated methods in accordance with some embodiments of the present invention.

DETAILED DESCRIPTION OF THE INVENTION

Figure 1:
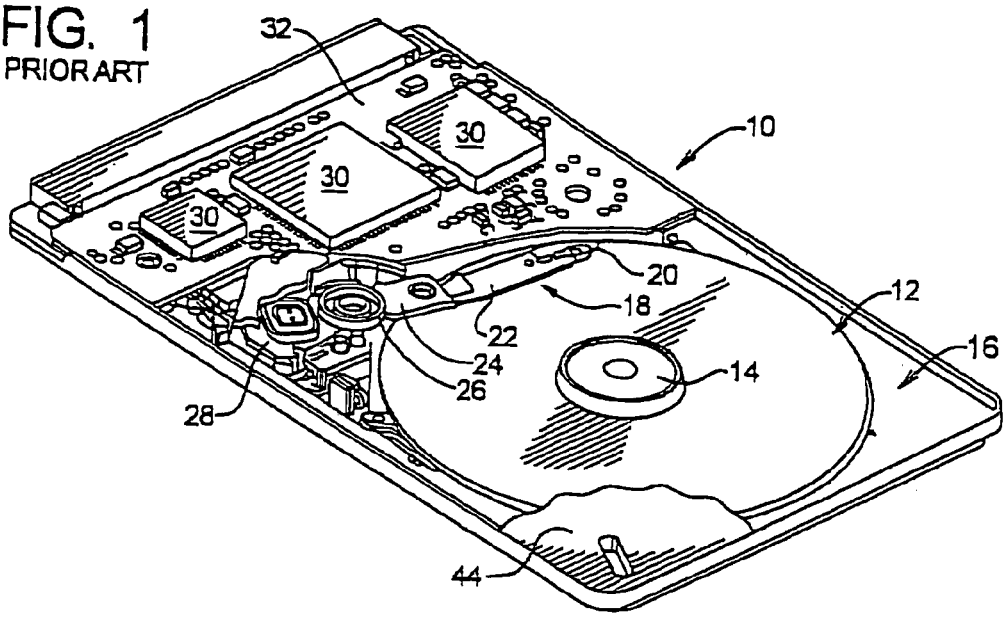
FIG. 1 is a perspective view of a conventional disk drive.
Figure 2:
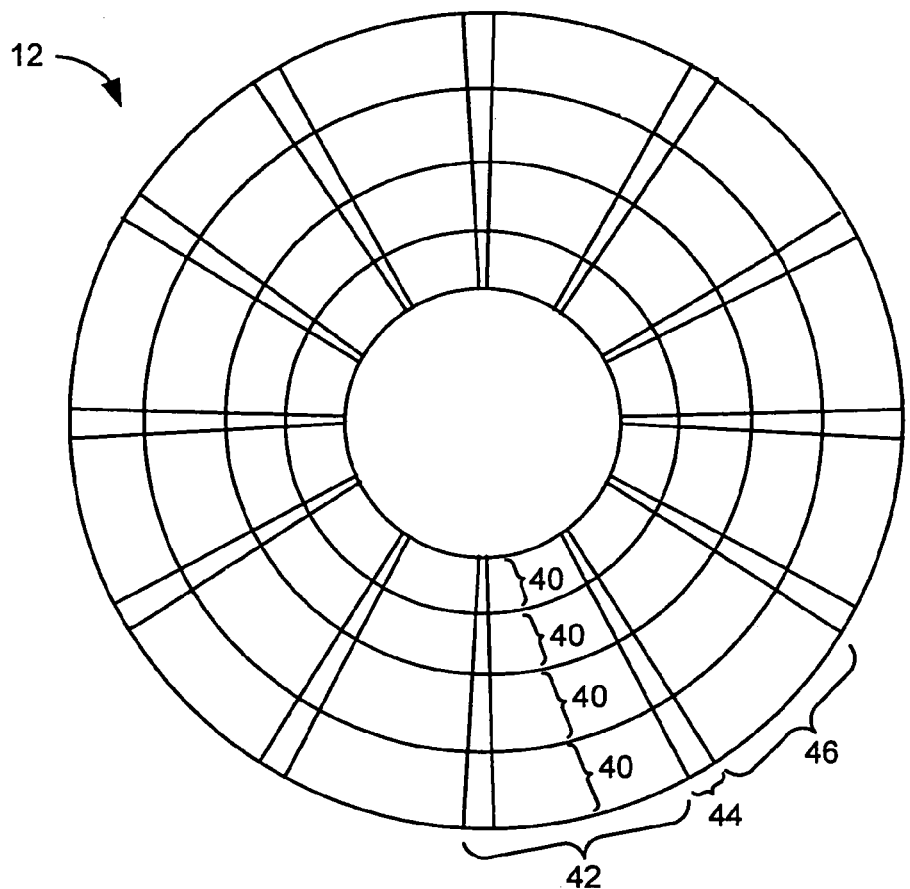
FIG. 2 is a top view of a conventional disk and illustrates tracks and sectors, with each of the sectors being divided into a servo sector and a data sector.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" includes any and all combinations of one or more of the associated listed items. In the drawings, the size and relative sizes of regions may be exaggerated for clarity.

Some embodiments of the present invention can provide disk drives, servo channels, and methods. Accordingly, the present invention may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system.

The present invention is described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

FIG. 4 is a block diagram of a disk drive and illustrates a servo channel, a servo controller, and associated methods in accordance with some embodiments of the present invention. The disk drive includes the data storage disk 12, the transducer 20, the VCM 28, a pre-amplifier 400, an analog-to-digital (A/D) converter 410, a finite impulse response (FIR) filter 420, a chuck synchronization module 430, a radial incoherence compensator 440, a Viterbi detector 450, a servo controller 460, and a data controller 470.

For purposes of explaining exemplary embodiments of the present invention, the servo information recorded in servo sectors 44 of the disk 12 includes at least some of the fields that are illustrated and described with regard to FIG. 3. Moreover, at least some of the digital data storing fields (e.g., preamble field 732, SAM field 733, LSBs field 734, spoke number field 735, and/or track number field 736) of the servo sectors 44 are encoded. When, for example, a STW is writing servo information to the servo sectors 44, an un-coded servo information bit (e.g., 0 or 1), which is referred as a symbol, can be written on the disk 12 as one or more signs or magnetic transitions (+ or −). Using a bi-phase code, two signs are used, and a symbol (un-coded servo information bit) may be encoded as follows:

"1" is written as "+−"; and
"0" is written as "−+".

Using a wide bi-phase (WBP) code, with code rate ¼, a symbol may be encoded as follows:

"1" is written as "−−++"; and
"0" is written as "++−−".

Various embodiments of the present invention are described below in the context of WBP encoded servo information in the servo sectors 44 for purposes of explanation. It is to be understood, however, that embodiments of the present invention are not limited to WBP encoded servo information and, instead, may be used with other forms of encoded or un-encoded servo information. The servo information in servo sectors 44 can include Gray coding so as to avoid large track address estimation errors when the transducer 20 overlaps and simultaneously reads from two adjacent servo tracks while seeking to a target track.

With continuing reference to FIG. 4, the transducer 20 generates a servo information read signal while it reads from the servo sectors 44. The read signal is amplified by the pre-amplifier 400 and sampled by the A/D converter 410 to form a series of sampled values. The FIR filter 420 is, for purposes of illustration, configured to generate as an output therefrom a class IV partial response (PR4) target to the sampled values. Each WBP coded symbol maps to four servo channel values from the FIR filter 420, which can be referred to as a dibit. The chunk synchronization unit 430 is configured to determine where among the sampled values each WBP coded symbol begins and ends, such as by synchronizing itself to each group of four values associated with a coded symbol.

By way of example, when the partial response target is a PR4 target, such as 1, 0, −1, the combined FIR filter 420 and chunk synchronization unit 430 may operate to generate the following output as a sequence of servo values at each servo channel bit time for a WBP coded symbol:

A) in response to an input value transition from 0 to 0, they output 1, 1, −1, −1;
B) in response to an input value transition from 1 to 1, they output −1, −1, 1, 1;
C) in response to an input value transition from 1 to 0, they output −−1, −1, 0, 0; and
D) in response to an input value transition from 0 to 1, they output 1, 1, 0, 0.

By way of another example, when the partial response target is another PR4 target, such as 1, 0, −2, 0, 1, the combined FIR filter 420 and chunk synchronization unit 430 may operate to generate the following responsive output as a sequence of servo values at each servo channel bit time for a WBP coded symbol:

A) in response to an input value transition from 1 to 1, they output 2, 2, −2, −2;
B) in response to an input value transition from 0 to 0, they output −2, −2, 2, 2;
C) in response to an input value transition from 0 to 1, they output −1, −1, −1, −1; and
D) in response to an input value transition from 1 to 0, they output 1, 1, 1, 1.

Figure 5A:
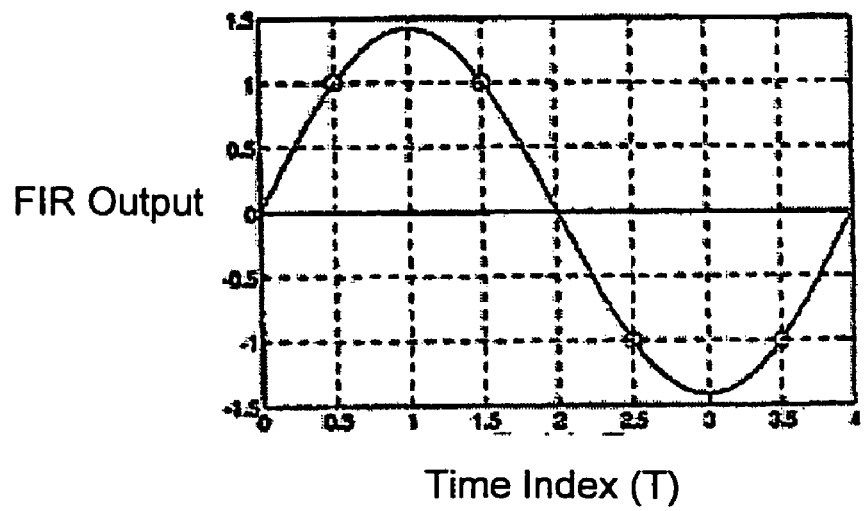
FIG. 5A is a graph that illustrates a class IV partial response target from a finite impulse response filter and chunk synchronizer in response to an input value transition from 0 to 0 and mapped onto a sinusoidal function.
Figure 5B:
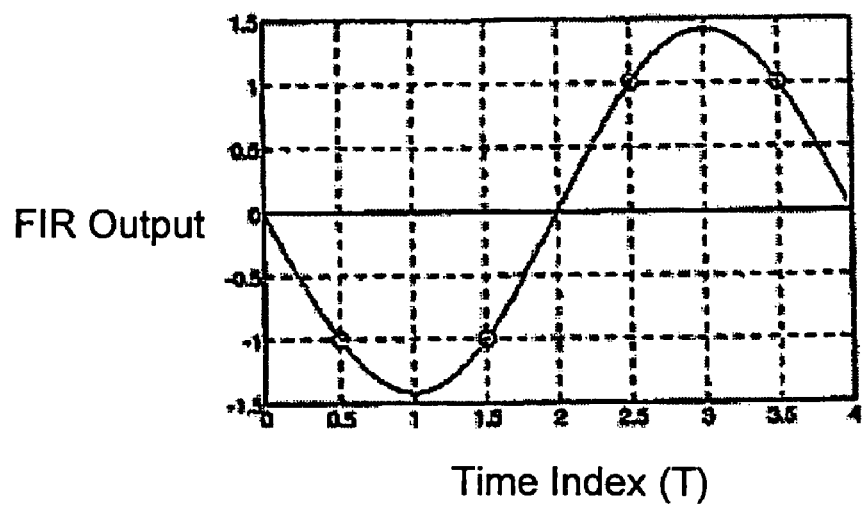
FIG. 5B is a graph that illustrates a class IV partial response target from a finite impulse response filter and chunk synchronizer in response to an input value transition from 1 to 1 and mapped onto a sinusoidal function.

In the case of the above-described partial response target of 1, 0, −1, when the WBP coded symbol is accurately framed by the FIR filter 420 and chunk synchronization unit 430, their response to an input value transition from 0 to 0 or from 1 to 1 can be represented by a sinusoidal function, such as those illustrated by the graphs of FIGS. 5A and 5B. FIG. 5A illustrates the response output of the FIR filter 420 and chunk synchronization unit 430 to a transition from 0 to 0 and mapped onto a sinusoidal function. FIG. 5B illustrates the response output of the FIR filter 420 and chunk synchronization unit 430 to a transition from 1 to 1 and mapped onto another sinusoidal function.

Figure 6:
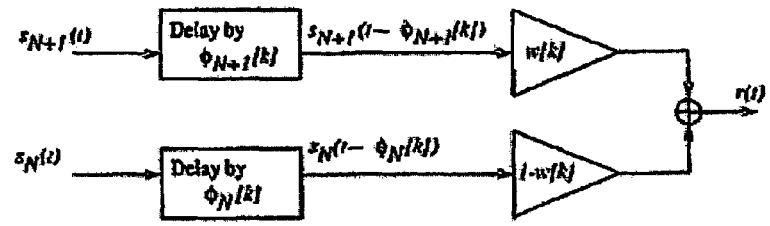
FIG. 6 is a block diagram of a mathematical model of the read signal r(t) when the servo information read from radially adjacent servo tracks is not phase aligned and, is thereby, effected by radial incoherency between the adjacent servo information.

During a seek operation, the servo controller 460 controls the VCM 28 to move the transducer 20 from an initial track to a target track where data is to be read/written at a logical block address defined by a read/write command from a host computer. As the transducer 20 scans across the disk, it can read servo information from more than one servo track within the same one of the servo sectors 44. The read servo information is used by the servo controller 460 to estimate the radial location of the transducer 20 relative to the target track. The read signal "r(t)" from the transducer 20 can therefore include a first component from servo information read from a first servo track and a second component from servo information read from a second servo track that is radially adjacent to the first servo track, and it may include further components from servo information read from other radially adjacent servo tracks in the same servo sector 44. FIG. 6 is a block diagram of a mathematical model of the read signal r(t) when the servo information read from radially adjacent servo tracks is not phase aligned and, is thereby, effected by radial incoherency between the adjacent servo information.

Referring to FIG. 6, the read signal r(t) with radial incoherence is modeled as a weighted sum of signals from the radially adjacent servo tracks N and N+1, which respectively have different relative phases $\phi_N[k]$ and $\phi_{N+1}[k]$. The phases $\phi_N[k]$ and $\phi_{N+1}[k]$ are in units of a servo channel bit "T". The signal read from track N+1 is represented by $S_{N+1}(t)$, and the signal read from track N is represented by $S_N(t)$. The signals $S_N(t)$ and $S_{N+1}(t)$ differ from each other when reading the Gray code portion of the servo information by one user Gray bit. The relative contributions of tracks N+1 and N to the read signal r(t) are represented by respective weighting functions (w[k]) and (1−w[k]).

Figure 7:
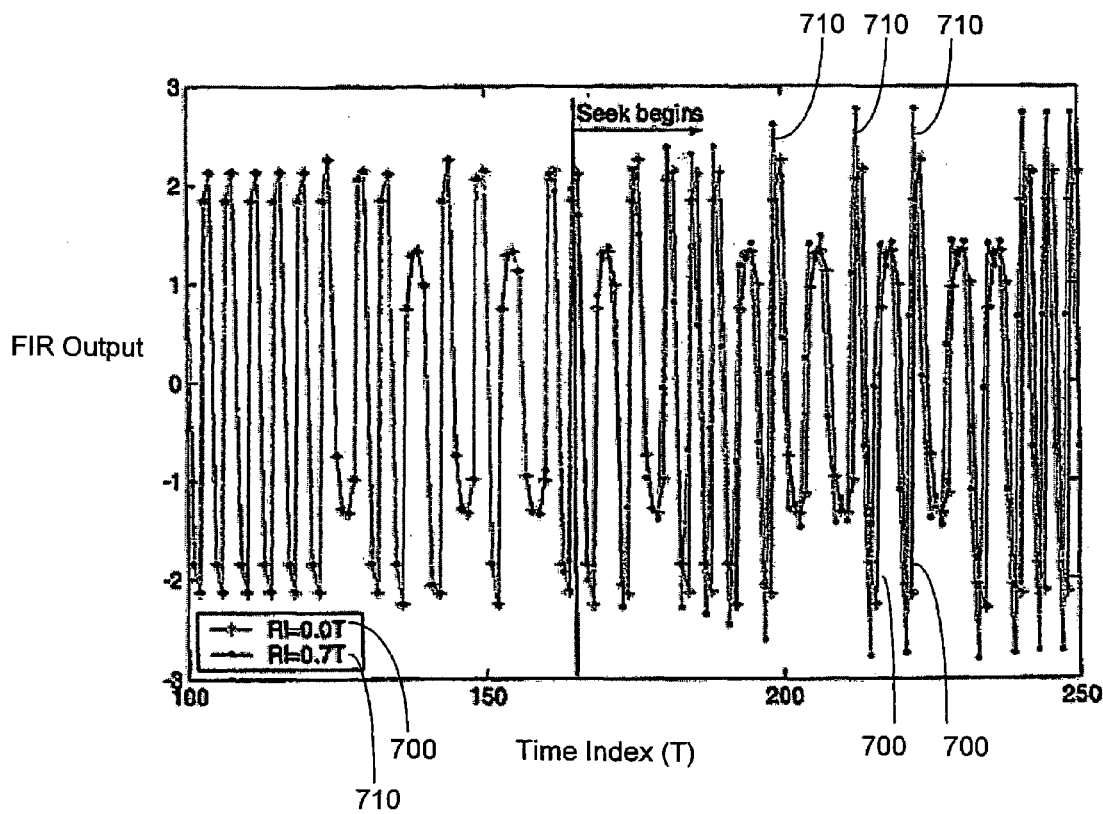
FIG. 7 is a graph of a simulation that illustrates the effect of radial incoherence between servo tracks on the output of a FIR filter before and after initiating a seek operation.

FIG. 7 is a graph of a simulation that illustrates the effect of radial incoherence between servo tracks on the output of the FIR filter 420 before and after initiating a seek operation. The Y-axis represents the output of the FIR filter 420 and the x-axis represents a servo channel bit time index (T). One of the FIR output signal plots 700 (indicated by star designated points) was generated when servo tracks N and N+1 had no radial incoherence therebetween, and the other read signal plot 710 (indicated by solid circle designated points) was generated when servo tracks N and N+1 had a radial incoherence therebetween of 0.7 T. As shown in FIG. 7, while the servo controller 460 is controlling the transducer 20 to follow a track (track following mode), the FIR output signals 700 and 710 substantially overlap because they are not affected by the presence/absence of radial incoherence between radially adjacent servo track(s).

However, after a seek mode is initiated at a time $T_S$ of about 165, the FIR output signals 700 and 710 become different, where the FIR output signal 710 with radial incoherence obtains greater amplitude variations than the FIR output signal 700 without radial incoherence. Accordingly, radial incoherence distorts the amplitude of the FIR output signal. Such distortion, if left uncompensated, may degrade the ability of the Viterbi detector 450 to properly detect the servo information and/or the ability of the servo controller 460 to properly estimate the location of the transducer 20 while seeking it to a target track. For simulation purposes, it was assume that the transducer 20 crossed each servo track in 50 servo channel bits T (i.e., every 50 bits T, $W_N[k]$ changed from 1 to 0 and then 0 to 1).

Referring again to FIG. 4, the radial incoherence compensator 440 is configured to compensate for the effects of radial incoherence between radially adjacent servo tracks according to some embodiments of the present invention. The radial incoherence compensator 440 can include a phase error estimator 442 and a phase compensator 444. The phase error estimator 442 is configured to determine a phase error in a group of read servo information values output by the chunk synchronization unit 430. The phase compensator 444 is configured to compensate the servo information values to at least reduce, or eliminate, the phase error so as to generate compensated servo information values. The phase compensator 444 can generate the compensated servo information values by adjusting the amplitudes of the servo information values in response to the determined phase error.

As explained above, the combined FIR filter 420 and chunk synchronization unit 430 output a sequence of four servo values when the read servo information is WBP encoded. Referring to the four servo values output by the chunk synchronization unit 430 as $y_1$, $y_2$, $y_3$, and $y_4$, respectively, the phase error estimator 442 can estimate the phase error $\hat{\tau}$ based on the following relationship:

$$\hat{\tau} = \frac{2}{\pi} a\tan\left(\frac{y_1 - y_3}{y_2 - y_4}\right) - 0.5, \qquad \text{(Equation 1)}$$

The phase error estimator 442 may carry out the phase error estimation according to Equation 1 for an input transition from 0 to 0 and/or an input transition from 1 to 1. For an input transition from 1 to 0 and/or for an input transition from 0 to 1, the phase error estimator 442 can output the phase error which was estimated for a previous dibit transition (i.e., from 0 to 0 or from 1 to 1). When the partial response target is 1, 0, −2, 0, 1, transitions from 0 to 1 and from 1 to 0 can be identified by the following relationship:

$$\left|\sum_{k=1}^{4} \text{sign}(y_k)\right| > 2, \qquad \text{(Equation 2)}$$

while transitions from 1 to 1 and from 0 to 0 can be identified by the following relationship:

$$\left|\sum_{k=1}^{4} \text{sign}(y_k)\right| < 2. \qquad \text{(Equation 3)}$$

The phase compensator 444 can adjust the amplitudes of the servo information values, output by the chunk synchronization unit 430, in response to the phase error from the phase error estimator 442 to generate amplitude adjusted servo information values therefrom. The phase compensator 444 may adjust the amplitudes of the servo information values by interpolating among the values in response to the phase error determined by the phase error estimator 442.

Figure 8A:
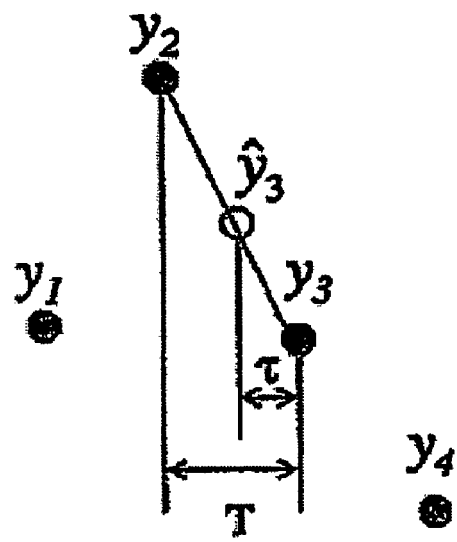
FIG. 8A is a graph that illustrates interpolation that may be carried out to adjust the amplitudes of servo information values to compensate for positive phase error due to radial incoherence according to some embodiments of the present invention.

By way of example with reference to FIG. 8A, a first order interpolation is carried out among a dibit of servo information values ($y_1$, $y_2$, $y_3$, $y_4$) in response to a determined positive phase error ($\hat{\tau}$). The amplitude of each of the servo information values ($y_1$, $y_2$, $y_3$, $y_4$) is adjusted by first order interpolation to compensated for the phase error ($\hat{\tau}$) by the following relationships:

$$\hat{y}_1 = y_1 + \left(\frac{y_2 - y_1}{T}\right) * \tau, \qquad \text{(Equation 4)}$$

$$\hat{y}_2 = y_2 + \left(\frac{y_2 - y_1}{T}\right) * \tau, \qquad \text{(Equation 5)}$$

$$\hat{y}_3 = y_3 + \left(\frac{y_4 - y_3}{T}\right) * \tau, \text{ and} \qquad \text{(Equation 6)}$$

$$\hat{y}_4 = y_4 + \left(\frac{y_4 - y_3}{T}\right) * \tau. \qquad \text{(Equation 7)}$$

Figure 8B:
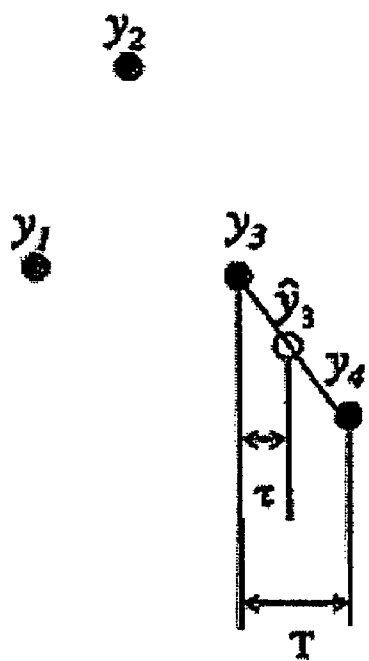
FIG. 8B is a graph that illustrates interpolation that may be carried out to adjust the amplitudes of servo information values to compensate for negative phase error due to radial incoherence according to some embodiments of the present invention.

By way of another example with reference to FIG. 8B, a first order interpolation is carried out among the dibit of servo information values ($y_1$, $y_2$, $y_3$, $y_4$) in response to a determined negative phase error ($\hat{\tau}$). The amplitude of each of the servo information values ($y_1$, $y_2$, $y_3$, $y_4$) is adjusted by first order interpolation to compensated for the phase error ($\hat{\tau}$) using the relationships defined above in Equations 4, 5, 6, and 7.

Although exemplary embodiments of the phase compensator 444 have been described in the context of adjusting the amplitudes of the servo information values by linear interpolation, other interpolation/extrapolation techniques may be used and/or non-interpolation based relationships may be substituted therefore.

Figure 9:
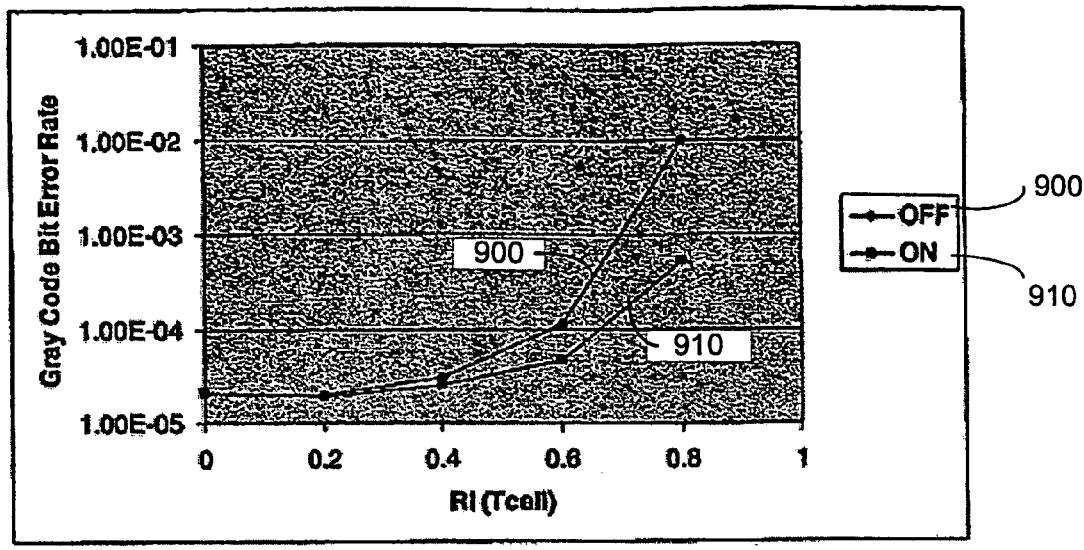
FIG. 9 is a graph of a simulation that compares the possible effect of the use phase error detection and phase compensation and the non-use of such detection and compensation on the variation in bit error rate as a function of an amount of radial incoherence when reading Gray code in servo information while seeking a transducer.

FIG. 9 is a graph of a simulation that compares the possible effect of use phase error detection and phase compensation and non-use of such detection and compensation on the variation in bit error rate as a function of an amount of radial incoherence when reading Gray code in servo information while seeking the transducer 20. The graph 900 illustrates the variation in bit error rate that may be obtained as a function of an amount of radial incoherence when the phase error estimator 442 and the phase compensator 444 are not used to compensate for the effect of the radial incoherence in the read signal of the Gray code. The graph 910 illustrates the variation in bit error rate that may be obtained as a function of an amount of radial incoherence when the phase error estimator 442 and the phase compensator 444 are used to compensate for the effect of the radial incoherence in the read signal of the Gray code. As shown, the phase error estimator 442 and the phase compensator 444 may decrease the error rate in the presence of radial incoherence between servo information. For the simulations, the PR target response was 1, 0, −2, 0, 1, and the seeking was modeled as occurring at the end of a sync mark.

The Viterbi detector 450 is configured to detect the compensated servo information values from the phase compensator 444 by, for example, removing inter symbol interference. The Viterbi detector 450 may be configured in a conventional manner to use a trellis diagram approximation of an inter symbol interference channel to determine the most likely input sequence thereto.

The data controller 470 may operate in a conventional manner to format data communicated between a host computer, or other external device, and the disk 12. A write channel 480 may operate in a conventional manner to convert data from the digital form used by the data controller 470 and the analog form written onto the disk 12 through the transducer 20. As explained above, the servo controller 460 uses the compensated servo values from the Viterbi detector 450 to control the VCM 28 to seek the transducer 20 to a target track identified by a read/write command from a host computer or other external device.

Figure 10:
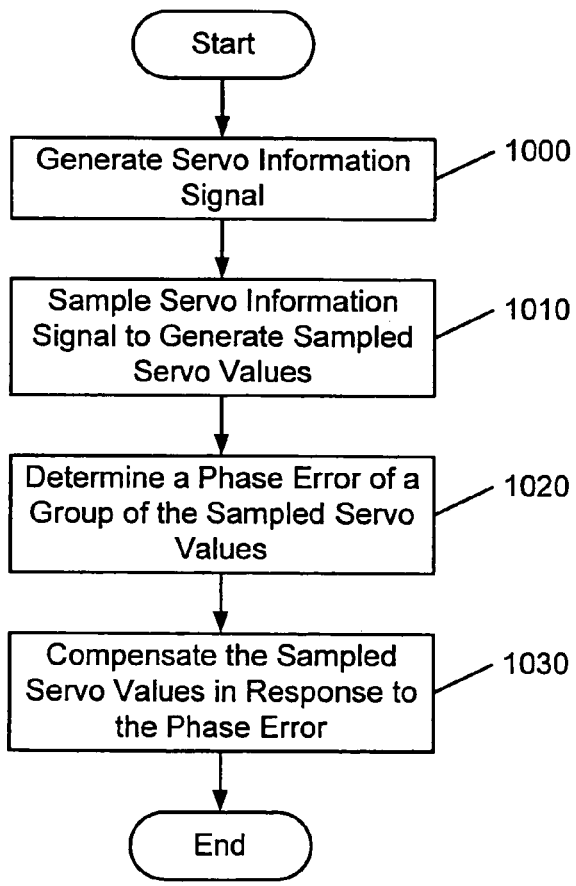
FIG. 10 is flowchart of methods of phase error detection and phase compensation according to some embodiments of the present invention.

FIG. 10 illustrates a flowchart of operations for compensating for radial incoherence in servo information read from adjacent servo tracks that have a phase offset relative to one another on a data storage disk drive in accordance with some embodiments of the present invention. Servo information signals are generated at Block 1000 by reading servo information from a servo sector on the disk. The servo information signal includes a first component from servo information read from a first servo track on the disk and a second component from servo information read from a second servo track on the disk that is radially adjacent to the first servo track. The servo information in the first servo track is offset by a non-zero phase error relative to the servo information in the second servo track. The servo information signal is sampled at Block 1010 to generate a series of sampled servo values. A phase error of a defined group of the sampled servo values is determined at Block 1020. The sampled servo values are compensated at Block 1030 in response to the determined phase error to generate compensated servo values with at least reduced or eliminated phase error. The compensation may include adjusting the magnitude of the sampled servo values through interpolation in response to the determined phase error.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method comprising:
while moving a transducer seeking a target track, generating a servo information signal having a first component from servo information read from a first servo track on a disk and a second component from servo information read from a second servo track that is radially adjacent to the first servo track, wherein the servo information in the first and second servo tracks are offset by a non-zero phase error relative to one another and are in a same servo sector on the disk;
sampling the servo information signal to generate a series of sampled servo values;
determining a phase error between the first and second components of the servo information signal from the radially adjacent first and second servo tracks in the sampled servo values; and
compensating the sampled servo values in response to the determined phase error to generate compensated servo values with at least reduced phase error.

2. The method of claim 1, wherein the servo information signal is generated based on reading Gray code fields in the same servo sector on the disk while seeking a transducer of the disk drive to a target track on the disk.

3. The method of claim 1, wherein determining a phase error comprises determining a ratio between at least some of a group of sampled servo values, and determining the phase error based upon the determined ratio.

4. The method of claim 3, wherein determining a phase error comprises determining the phase error based on an arctangent of the determined ratio between at least some of the group of sampled servo values.

5. The method of claim 3, wherein the sampled servo values are wide bi-phase coded, the group of the sampled servo values have $y_1$, $y_2$, $y_3$, and $y_4$ values, and the method of determining a phase error comprises determining the phase error $\hat{\tau}$ based on the following relationship:

$$\hat{\tau} = \frac{2}{\pi} a\tan\left(\frac{y_1 - y_3}{y_2 - y_4}\right) - 0.5.$$

6. The method of claim 1, wherein compensating the sampled servo values in response to the determined phase error to generate compensated servo values with at least reduced phase error comprises:
adjusting amplitudes of the sampled servo values in response to the determined phase error to generate the compensated servo values.

7. The method of claim 6, wherein adjusting amplitudes of the sampled servo values in response to the determined phase error comprises interpolating among the amplitudes of the sampled servo values based on the determined phase error.

8. The method of claim 7, wherein interpolating among the amplitudes of the sampled servo values based on the determined phase error comprises carrying out a first order interpolation.

9. The method of claim 8, wherein the sampled servo values are wide bi-phase coded, the group of the sampled servo values have $y_1$, $y_2$, $y_3$, and $y_4$ values, and the method of interpolating among the amplitudes of the sampled servo values based on the determined phase error $\hat{\tau}$ comprises determining adjusted sampled servo values $\hat{y}_2$, $\hat{y}_2$, $\hat{y}_3$, and/or $\hat{y}_4$ based on respective ones of the following relationships:

$$\hat{y}_1 = y_1 + \left(\frac{y_2 - y_1}{T}\right) * \tau,$$

$$\hat{y}_2 = y_2 + \left(\frac{y_2 - y_1}{T}\right) * \tau,$$

$$\hat{y}_3 = y_3 + \left(\frac{y_4 - y_3}{T}\right) * \tau, \text{ and}$$

$$\hat{y}_4 = y_4 + \left(\frac{y_4 - y_3}{T}\right) * \tau.$$

10. The method of claim 1, further comprising outputting the compensated servo values to a servo information detector that detects servo information values in response to the compensated servo values.

11. The method of claim 10, wherein the servo information detector detects the servo information values based on a Viterbi operation.

12. A disk drive comprising:
a rotatable data storage disk comprising a plurality of radially distributed servo tracks in a same servo sector thereon, wherein servo information resides along each of the servo tracks in the same servo sector, and the servo information in a first one of the servo tracks is offset by a non-zero phase error relative to the servo information in a radially adjacent second one of the servo tracks;
a transducer that is configured to generate a servo information signal from the servo information in the servo tracks;
an actuator that is configured to position the transducer relative to the disk;
a servo controller that is configured to move the actuator and the transducer seeking a target track, wherein the servo information signal generated by the transducer while moving comprises a first component from the servo information in the first servo track and a second component from the servo information in the second servo track while moving the transducer;
a sampling circuit that is configured to sample the servo information signal to generate a series of sampled servo values; and
a radial incoherence compensator that is configured to determine a phase error between the first and second components of the servo information signal from the radially adjacent first and second servo tracks in the sampled servo values, and to compensate the sampled servo values in response to the determined phase error to generate compensated servo values with at least reduced phase error.

13. The disk drive of claim 12, wherein the radial incoherence compensator is configured to determine the phase error of a group of sampled servo values when the servo information signal is formed by reading Gray code fields in the same servo sector on the disk while the transducer is seeking to the target track.

14. The disk drive of claim 12, wherein the radial incoherence compensator is further configured to determine the phase error based on a ratio between at least some of a group of sampled servo values.

15. The disk drive of claim 14, wherein the radial incoherence compensator is further configured to determining the phase error based on an arctangent of the determined ratio between at least some of a group of sampled servo values.

16. The disk drive of claim 15, wherein the sampled servo values are wide bi-phase coded, and further comprising a Finite Impulse Response (FIR) filter configured to generate $y_1$, $y_2$, $y_3$, and $y_4$ values for each group of the sampled servo values, and the radial incoherence compensator comprises a phase error estimator that is configured to determine the phase error $\hat{\tau}$ based on the following relationship:

$$\hat{\tau} = \frac{2}{\pi} a\tan\left(\frac{y_1 - y_3}{y_2 - y_4}\right) - 0.5.$$

17. The disk drive of claim 12, wherein the radial incoherence compensator comprises a phase compensator that is configured to adjust amplitudes of the sampled servo values in response to the determined phase error to generate the compensated servo values.

18. The disk drive of claim 17, wherein the phase compensator is further configured to adjust amplitudes of the sampled servo values by interpolating among the amplitudes of the sampled servo values based on the determined phase error.

19. The disk drive of claim 18, wherein the phase compensator is further configured to adjust amplitudes of the sampled servo values by carrying out a first order interpolation among the amplitudes of the sampled servo values based on the determined phase error.

20. The disk drive of claim 19, wherein the sampled servo values are wide bi-phase coded, and further comprising a Finite Impulse Response (FIR) filter configured to generate $y_1$, $y_2$, $y_3$, and $y_4$ values for each group of the sampled servo values, and the phase compensator is further configured to interpolate among the amplitudes of the sampled servo values based on the determined phase error $\hat{\tau}$ to generate adjusted sampled servo values $\hat{y}_1$, $\hat{y}_2$, $\hat{y}_3$, and/or $\hat{y}_4$ based on respective ones of the following relationships:

$$\hat{y}_1 = y_1 + \left(\frac{y_2 - y_1}{T}\right) * \tau,$$

$$\hat{y}_2 = y_2 + \left(\frac{y_2 - y_1}{T}\right) * \tau,$$

$$\hat{y}_3 = y_3 + \left(\frac{y_4 - y_3}{T}\right) * \tau, \text{ and}$$

$$\hat{y}_4 = y_4 + \left(\frac{y_4 - y_3}{T}\right) * \tau.$$

21. The disk drive of claim 12, further comprising a servo information detector that is configured to detect servo information values in response to the compensated servo values.

22. The disk drive of claim 21, wherein the servo information detector is configured to carry out a Viterbi operator on the compensated servo values.

23. A circuit comprising:
a compensator that determines phase error between first and second components of servo information signal read from radially adjacent first and second servo tracks in a same servo sector while a transducer is moving seeking a target track, and generates compensated servo information having at least reduced phase error.

* * * * *